(12) United States Patent
Fainberg et al.

(10) Patent No.: US 12,615,289 B2
(45) Date of Patent: *Apr. 28, 2026

(54) ROGUE DEVICE DETECTION INCLUDING MAC ADDRESS SPOOFING DETECTION

(71) Applicant: FORESCOUT TECHNOLOGIES, INC., San Jose, CA (US)

(72) Inventors: Ilya Fainberg, Tel Aviv (IL); Abdelhamid Masarwa, Arara (IL); Oren Nechushtan, Ramat-Gan (IL); Oded Comay, Tel Aviv (IL)

(73) Assignee: Forescout Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/761,048

(22) Filed: Jul. 1, 2024

(65) Prior Publication Data

US 2024/0356966 A1      Oct. 24, 2024

Related U.S. Application Data

(63) Continuation of application No. 17/732,358, filed on Apr. 28, 2022, now Pat. No. 12,028,371, which is a (Continued)

(51) Int. Cl.
*H04L 9/00* (2022.01)
*H04L 9/40* (2022.01)
(Continued)

(52) U.S. Cl.
CPC ...... *H04L 63/1466* (2013.01); *H04L 63/0853* (2013.01); *H04W 12/06* (2013.01); *H04W 12/122* (2021.01); *H04L 2101/622* (2022.05)

(58) Field of Classification Search
CPC ......................... H04L 63/1466; H04W 12/122
See application file for complete search history.

(56) References Cited

U.S. PATENT DOCUMENTS 6,745,333 B1    6/2004    Thomsen
7,447,184 B1    11/2008    Kharvandikar et al.
(Continued)

FOREIGN PATENT DOCUMENTS

CN    104869117 A    8/2015
CN    104869117 B    8/2018

OTHER PUBLICATIONS

International Search Report for the International Application No. PCT/US2019/057840, Mailed Dec. 17, 2019.

*Primary Examiner* — Christopher J Brown
(74) *Attorney, Agent, or Firm* — Womble Bond Dickinson (US) LLP

(57)    ABSTRACT

Systems, methods, and related technologies including media access control (MAC) address spoofing detection are described. The MAC address spoofing detection and response may include accessing a first media access control (MAC) address associated with a first communication on a first port of a first network device coupled to a network, accessing a second media access control (MAC) address associated with a second communication on a second port of a second network device coupled to the network, and determining that the second MAC address matches the first MAC address The method further includes identifying a device associated with the first or second communication as being associated with a spoofing event based on the second port differing from the first port and based on the first and second timestamps being within a threshold amount of time from one another and performing an action associated with the first or second port.

17 Claims, 6 Drawing Sheets

Related U.S. Application Data continuation of application No. 16/237,229, filed on Dec. 31, 2018, now Pat. No. 11,349,867.

(51) Int. Cl.
| | | |
|---|---|---|
| *H04W 12/06* | (2021.01) | |
| *H04W 12/122* | (2021.01) | |
| H04L 101/622 | (2022.01) | |

(56) References Cited

U.S. PATENT DOCUMENTS

| | | | | |
|---|---|---|---|---|
| 9,749,337 | B2 * | 8/2017 | Shim | H04L 63/1408 |
| 9,781,696 | B1 * | 10/2017 | Soave | H04W 4/80 |
| 2004/0198392 | A1 * | 10/2004 | Harvey | H04W 12/122 |
| | | | | 455/456.1 |
| 2004/0213172 | A1 * | 10/2004 | Myers | H04W 12/122 |
| | | | | 370/313 |
| 2005/0114880 | A1 | 5/2005 | Gould | |
| 2007/0067823 | A1 | 3/2007 | Shim et al. | |
| 2008/0250498 | A1 * | 10/2008 | Butti | H04W 12/122 |
| | | | | 726/23 |
| 2013/0343364 | A1 * | 12/2013 | Fuller | H04W 64/00 |
| | | | | 370/338 |

* cited by examiner

100

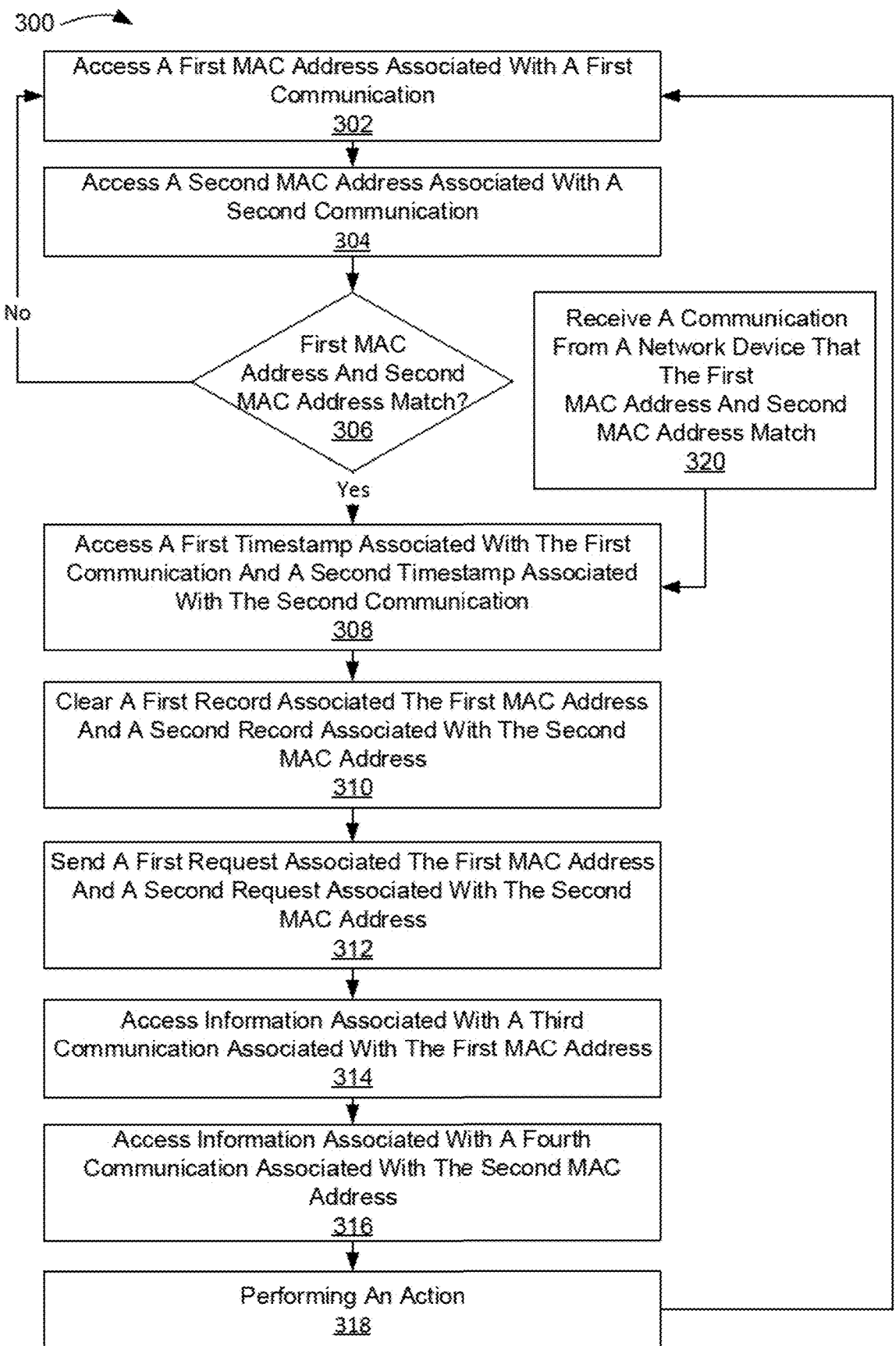

300

Access A First MAC Address Associated With A First
Communication
302

Access A Second MAC Address Associated With A
Second Communication
304

First MAC
Address And Second
MAC Address Match?
306

No

Receive A Communication
From A Network Device That
The First
MAC Address And Second
MAC Address Match
320

Yes

Access A First Timestamp Associated With The First
Communication And A Second Timestamp Associated
With The Second Communication
308

Clear A First Record Associated The First MAC Address
And A Second Record Associated With The Second
MAC Address
310

Send A First Request Associated The First MAC Address
And A Second Request Associated With The Second
MAC Address
312

Access Information Associated With A Third
Communication Associated With The First MAC Address
314

Access Information Associated With A Fourth
Communication Associated With The Second MAC
Address
316

Performing An Action
318

Fig. 3

Network Communication Interface
502

External System Interface
504

Traffic Monitor Component
506

Network Device Monitor Component
508

Characteristic Determination Component
510

Display Component
514

Notification Component
516

Policy Component
518

MAC Address Spoofing Determination Component
520

Records Modification Component
530

500

ROGUE DEVICE DETECTION INCLUDING MAC ADDRESS SPOOFING DETECTION

CROSS-REFERENCE TO RELATED APPLICATIONS

This application is a continuation of U.S. application Ser. No. 17/732,358, filed Apr. 28, 2022, which is a continuation of U.S. application Ser. No. 16/237,229, filed Dec. 31, 2018, now U.S. Pat. No. 11,349,867, issued on May 31, 2022, the entire contents of which are hereby incorporated by reference.

TECHNICAL FIELD

Aspects and implementations of the present disclosure relate to network security, and more specifically, detecting one or more rogue devices.

BACKGROUND

As technology advances, the number and variety of devices that are connected to communications networks are rapidly increasing. Each device may have its own respective vulnerabilities which may leave the network open to compromise or other risks. Preventing the spreading of an infection of a device or an attack on a network can be important for securing a communication network.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 3 depicts a flow diagram of aspects of a method for detecting a rogue device based on media access control (MAC) address spoofing in accordance with one implementation of the present disclosure.

DETAILED DESCRIPTION

Figure 1:
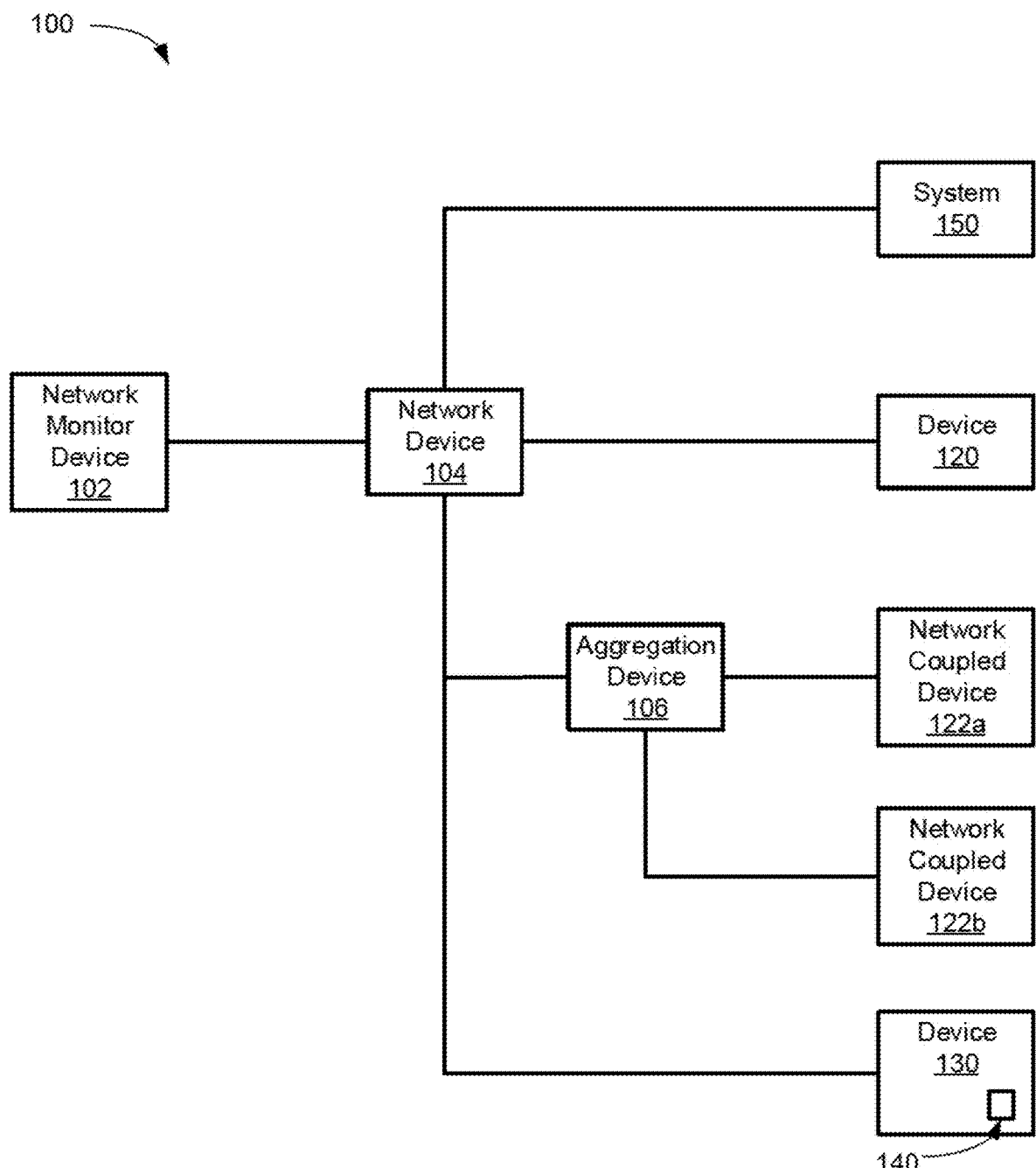
FIG. 1 depicts an illustrative communication network in accordance with one implementation of the present disclosure.

Aspects and implementations of the present disclosure are directed to rogue device detection. The systems and methods disclosed can be employed with respect to network security, among other fields. More particularly, it can be appreciated that rogue devices are a significant and growing problem. At the same time, the proliferation of network-connected devices (e.g., Internet Of Things (IoT)) devices such as televisions, security cameras, wearable devices, medical devices, etc.), which often have limited security capabilities, and are prone to being a target of attacks thereby making it difficult to effectively ensure that network security is maintained. Accordingly, described herein in various implementations are systems, methods, techniques, and related technologies, which allows for rogue device detection, including MAC address spoofing detection, and taking one or more actions in response to detecting a rogue device.

In the last few years the number of connected devices has grown exponentially while prices are drastically dropping. This trend introduces an extensive risk to the organization, it is now easier than ever to build a malicious rogue traditional device (e.g., laptop or printer), bring it to a corporate location, and seamlessly introduce it into the organizational network to cause damage to critical services or exfiltrate data.

Products in the industry are lacking in the ability to identify rogue devices spoofing a MAC address quickly. Current methodologies for identifying rogue devices require manual policy creation having high rates of false positives. In addition, corporations may have difficulty in passing internal and external audits due to the inability to accurately identify rogue devices spoofing a MAC address.

Network access control (NAC) products are not able to detect and prevent, for example, in real time or near real time, various rogue devices (e.g., an impersonating device, a rogue unauthorized IoT device, or a sniffing device) from taking malicious actions and thus fail to prevent attacks, including data exfiltration and damage to critical services, on a network.

Embodiments can identify rogue devices that are impersonating devices, via MAC address spoofing using a capability (e.g., distributed) to monitor and correlate information from each entry point or network device to the network across the deployment. In some embodiments, the identification of rogue devices is performed in near real time or in real time. For example, rogue devices that are spoofing a MAC address of another device on a network may be identified promptly using ongoing monitoring of MAC addresses being used on the network and responding promptly, as described herein.

Entry points may include a switch, a router, a firewall, a hypervisor, a software-defined networking (SDN) controller, a virtual firewall, a wireless access point or wireless local area network (LAN), a virtual private network (VPN), or other network device or infrastructure (e.g., virtual or physical) that may provide network access to one or more devices (e.g., IoT devices, computers, laptops, tablets, virtual machines, etc.). An organization may have multiple entry points or connection points into the organization (e.g., switches, WLAN, etc.). Across each of these, an attacker may attempt to penetrate or connect to the network by spoofing (e.g., copying) a MAC address of another device on the network and entering or accessing the network via one or more entry points.

Various embodiments can be configured for real time or near real time continuous monitoring of each MAC address on one or more networks to allow for prevention or immediate response to any MAC address spoofing events throughout one or more networks (e.g., including communicatively coupled by wired and wireless network connections, local or remote networks, etc.). The MAC address spoofing detection can be performed across various regions, segments, different types of network infrastructure (e.g., virtual and physical), different IP addresses, different networks, etc. This allows embodiments to be non-disruptive to the victim device (if desired) while limiting access of the attacking device, if so desired (or configured).

Based on ongoing monitoring of the identity (e.g., MAC address) of each device communicatively coupled to any entry point of a network, embodiments can analyze information including the number of MAC addresses communicatively coupled to one or more networks at a time, the timestamp of each communicative coupling of each device, the ports of where each MAC address is communicatively coupled, and the number of MAC address changes across ports in a configured period of time as compared to the communicatively coupled MAC addresses. Based on this information, embodiments can determine, at any given time (e.g., pre-connect or post-connect), with close to or zero rate of false positives, which device is a rogue device or an attacker's device and which device is the victim of the MAC address spoofing attack. Embodiments are further able to distinguish between MAC address spoofing events and legitimate information technologies (IT) events (e.g., a MAC address moving from one port to another port as a device/user changes locations). In addition, the rogue device or attacker, victim, or a combination thereof can be isolated (e.g., by embodiments) from the network thereby ensuring that business functions or operations are not disrupted.

For example, if a legitimate device has a MAC address of AA:AA:AA:AA:AA:AA and there are 20 MAC addresses on a network being monitored, when a new device with a MAC address of AA:AA:AA:AA:AA:AA is identified, the newest device with the MAC address matching can be identified as an attacker or rogue device. The attacker device can be determined based on storing the port of the first instance of the MAC address, clearing the MAC address cache, table, or data store entries or records of the one or more switches associated with the AA:AA:AA:AA:AA:AA MAC address, then if two of the same MAC addresses communicate with the one or more switches, then it is determined that the second port with the same MAC address connected is an attacker based on having a timestamp after the original port and MAC address record associated with the original or victim device. Embodiments can thus include two heuristics: 1) a heuristic to distinguish between an attack and legitimate device movement (e.g., between two different ports); and 2) a heuristic to distinguish between victim and attacker. Isolation can then be performed for the just the attacker device or both the attacker device and victim device to protect the network.

The monitoring for MAC address spoofing can be done on an enterprise wide or global scale based on centralized monitoring. In some embodiments, multiple devices at multiple locations may perform the monitoring in a distributed or coordinated manner. The monitoring can be done during the connection to the network or any given time during connectivity to the network (e.g., in near real time on an ongoing basis). Prior methodologies are not able to monitor for MAC address spoofing after connection to a network or perform immediate control actions in response to MAC address spoofing.

Embodiments further support tracking of persistency of the movement of an attacker because a spoofed MAC address can be monitored going forward, e.g., as the spoofed MAC address moves to different ports. For example, as a MAC address spoofing device connects to a different part of a network, the connection or network entry points of the network (e.g., switches, wireless access points, etc.) where the attack is attempted can be tracked.

In some embodiments, in response to observing MAC address associated activity among two ports. Data or information from one or more network entry points where the MAC addresses are communicatively coupled may be stored. The information may include a port where the device with a particular MAC address is communicatively coupled, the MAC address, a timestamp of first or subsequent communications of the device, etc. A network entry point may be signaled to remove records associated with the MAC address on both ports. Then the network entry point records may be monitored for communications associated with that MAC address on both ports. If no further communications are seen on either of the ports associated with the MAC address, requests (e.g., ping commands) may be sent to both of the devices associated with the MAC address to attempt to get the devices communicatively coupled thereto to communicate.

In response to additional communications being observed, the original timestamps and port information may be accessed and action taken on the second port based on the stored timestamp associated with the second port and communication using the MAC address being after the stored timestamp associated with the first port (in time) and communicating using the MAC address. For example, blocking communication on that port via a command to the network entry point).

In some embodiments, changes among one or more ports, of MAC address are tracked. As a new communication on a port is observed, the MAC address is recorded or stored, and compared with previous MAC addresses that have been observed. In other words, the changes of locations of a MAC address on a per port basis are monitored for possible MAC address spoofing. Action may then be taken based on each new port associated with the same MAC address, where communication using a previously observed MAC address that is also communicating is used and the port block. Communications on subsequent ports using a matching MAC address may be blocked. Embodiments thus support blocking multiple ports as an attacker trying to spoof a MAC address moves to different ports on one or more network entry points.

In some embodiments, various factors may be used to prevent a denial of service in response to multiple ports having communication blocked therein due to a MAC address spoofing attack on those ports. For example, the blocking of communication on a port may be configured to be in effect for a period of time (e.g., one hour, a specified period of time plus a random amount of time, etc.).

In some embodiments, changes of location of each MAC address on a network may be tracked. For example, when a new device communicatively couples to the network, the MAC address of the device may be received by embodiments based on a notification received from the switch (or other network device) or accessed by querying the switch (or other network device). The MAC address of the device along with the timestamp and port where the MAC address is communicatively coupled may be stored by embodiments. When another device communicatively couples to the network and it is observed as having or using the same MAC address, the change of the communicatively coupling location or port change of the MAC address is recorded or stored and further changes are counted. Embodiments can thus count the changes of location of where the MAC address is communicatively coupled for when a device is moving from port to port (e.g., on the same network device or between network devices). In some embodiments, once the number of location (e.g., port) changes within a specified period of time (e.g., user configurable or default amount of time) reaches a threshold and more than one device is using the same MAC address, a MAC address spoofing event will be identified and action may be taken (e.g., automatically, for instance without user interaction).

Embodiments are configured to work with networks using the 802.1X protocol and other network authentication protocols. One of the main issues for 802.1X is that the MAC address bypass (MAB) list has MAC addresses for which devices are not authenticated as part of the 802.1X protocol (e.g., using Remote Authentication Dial-In User Service (RADIUS) authentication). The MAB list thus means that a device that is spoofing the MAC address of a device on the MAB list will be able to communicate on the network without authentication. For example, if an attacker knows or suspects that a printer's MAC address on MAB list, the attacker can spoof the MAC address of the printer and gain access to the network along with the ability to communicate on the network. Embodiments are able to identify the MAC address spoofing and block one or both of the devices (e.g., attacker and victim devices) as well as report the MAC address spoofing event.

Embodiments are able to detect MAC address spoofing on one or more network entry portions or network devices (e.g., a single switch or multiple switches), a virtual LAN (VLAN) or multiple VLANs, different switches and the same VLAN, and any combination thereof. Embodiments are further able to detect MAC address spoofing across multiple environments, e.g., campus, cloud, operational technology (OT), data center, and internet of things (IoT).

Advantageously, embodiments are configured to provide a protected (non-802.1X or 802.1X compliant) "post connect" functionality (e.g., NAC) for preventing and limiting MAC address spoofing. Embodiments are able to detect MAC address spoofing throughout the network based on ongoing monitoring and optionally facilitating enforcement or control of network access against a device using a spoofed MAC address. This is particularly important as MAC address spoofing detection will allow detection of many attacks that begin with MAC address spoofing. Embodiments reduce the amount of false positives, expedite the discovery of rogue devices of different types, and allow blocking of the spoofing device(s) in a timely manner (e.g., immediately). This will thereby reduce the attack surface of a network and enable organizations to successfully pass mandatory audits (e.g., audits related to network access control, MAC address spoofing, etc.). Embodiments further provide ongoing continuous MAC address spoofing detection and preventing an attacker from bypassing network access policies (e.g., 802.1X based policies). The MAC address spoofing detection can be performed across region, segment, different networking equipment, different IP address ranges, different networks, etc. Embodiments can be non-disruptive to the victim device (if desired) while limiting access to the spoofing device, (if so desired).

Accordingly, described herein in various implementations are systems, methods, techniques, and related technologies, which may perform segmentation policy management. As described herein, various techniques can be used to detect and respond to MAC address spoofing, as described herein.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

An entity or device, as discussed herein, can include devices (e.g., computer systems, for instance laptops, desktops, servers, mobile devices, IoT devices, OT devices, etc.), endpoints, virtual machines, services, serverless services (e.g., cloud based services), containers (e.g., user-space instances that work with an operating system featuring a kernel that allows the existence of multiple isolated user-space instances), cloud based storage.

FIG. 1 depicts an illustrative communication network 100, in accordance with one implementation of the present disclosure. The communication network 100 includes a network monitor device 102, a network device 104, an aggregation device 106, a system 150, devices 120 and 130, and network coupled devices 122a-b. The devices 120 and 130 and network coupled devices 122a-b may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 104 may be one or more network devices or (network) entry points, as described herein, configured to facilitate communication among aggregation device 106, system 150, network monitor device 102, devices 120 and 130, and network coupled devices 122a-b. Network device 104 may be one or more network switches or switches, access points, routers, firewalls, hubs, virtual network infrastructure, etc. Network device 104 may receive communications from system 150, devices 120 and 130, and aggregation device 106 and store various information about the devices communicatively coupled thereto, communicating with network device 104, or combination thereof. Network device 104 may store the information including the port where a device is communicatively coupled with network device 104, the time of the first or subsequent communication of a device with network device 104, the MAC address of the device communicating with network device 104, or a combination thereof. The information stored by network device 104 may be stored in a data store (e.g., cache, table with entries for each MAC address, data structure, etc.) with entries or records for each MAC address. This information may be accessed and stored by network monitor device 102.

Network monitor device 102 may be operable for a variety of tasks including detection of one or more rogue devices that are spoofing one or more MAC addresses of one or more devices on one or more networks. Network monitor device 102 is further operable to perform one or more actions in response to detecting a MAC address spoofing event. Network monitor device 102 may invoke or perform the one or more actions using various commands (e.g., using application programming interface (APIs), command line interface (CLI) commands, simple network management protocol (SNMP), etc.) to network device 104.

In some embodiments, network monitor 102 accesses communication information (e.g., MAC address information, port information, and timestamp information, as described here) from one or more network devices (e.g., network device 104, firewall 210, switch 202-206, etc.). This information can be used by network monitor device 102 to determine whether a MAC address spoofing event has occurred and where to perform an action (e.g., blocking a port on a particular network device).

Network monitor device 102 may provide an interface (e.g., graphical user interface (GUI)) for viewing, monitoring, configuring settings (e.g., wait periods, requests (e.g., ping requests) and other variables, as described herein. Actions to be performed (e.g., automatically) in response to each MAC address spoofing event can be selected and configured as well. In some embodiments, the controlling of communication on a particular port is performed without an agent installed on the entry point or network device.

Network monitor device 102 may further perform a variety of functions including identification, classification, and taking one or more remediation actions (e.g., changing network access of a victim device and an attacker device, change the virtual local area network (VLAN), send an alert (e.g., email), short message service (SMS), etc.). Device identification, classification, or combination thereof information may be used to provide details as part of an alert of the device spoofing the MAC address and possible actions that can be performed. For example, the identification and classification information associated with an entry point or network device can be used to determine type of network device and particular commands that can be used to enable configuring of the entry point to restrict traffic or block communications or traffic on a port where a device that is spoofing a MAC address is communicatively coupled.

Network monitor device 102 may be a computing system, network device (e.g., switch, router, firewall, an access point), network access control (NAC) device, intrusion prevention system (IPS), intrusion detection system (IDS), deception device, cloud-based device, virtual machine based system, etc. Network monitor device 102 may be communicatively coupled to the network device 104 in such a way as to receive network traffic flowing through the network device 104 (e.g., port mirroring, sniffing, acting as a proxy, passive monitoring, etc.). In some embodiments, network monitor device 102 may include one or more of the aforementioned devices. In various embodiments, network monitor device 102 may further support high availability and disaster recovery (e.g., via one or more redundant devices).

In some embodiments, network monitor device 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of entities by network monitor device 102 may be based on a combination of one or more pieces of information including traffic analysis, information from external or remote systems (e.g., system 150), communication (e.g., querying) with an aggregation device (e.g., aggregation device 106), and querying the entity itself (e.g., via an API, CLI, or web interface), which are described further herein. Network monitor device 102 may be operable to use one or more APIs to communicate with aggregation device 106, device 120, device 130, or system 150. Network monitor device 102 may monitor for or scan for entities that are communicatively coupled to a network via a NAT device (e.g., firewall, router, etc.) dynamically, periodically, or a combination thereof.

Information from one or more external or 3$^{rd}$ party systems (e.g., system 150) may further be used for determining characteristics of a victim device, an attacking device, or a network device. For example, a vulnerability assessment (VA) system may be queried to verify or check if an entity is in compliance and provide that information to network monitor device 102. External or 3$^{rd}$ party systems may also be used to perform a scan or a check on an entity to determine a software version.

Device 130 can include agent 140. The agent 140 may be a hardware component, software component, or some combination thereof configured to gather information associated with device 130 and send that information to network monitor device 102. The information can include the operating system, version, patch level, firmware version, serial number, vendor (e.g., manufacturer), model, asset tag, software executing on an entity (e.g., anti-virus software, malware detection software, office applications, web browser(s), communication applications, etc.), services that are active or configured on the entity, ports that are open or that the entity is configured to communicate with (e.g., associated with services running on the entity), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor device 102 may utilize information from the agent 140. While network monitor device 102 may be able to receive information from agent 140, installation or execution of agent 140 on many entities may not be possible, e.g., IoT or smart devices.

System 150 may be one or more external, remote, or third party systems (e.g., separate) from network monitor device 102 and may have information about devices 120 and 130 and network coupled devices 122*a-b*. System 150 may include a vulnerability assessment (VA) system, a threat detection (TD) system, endpoint management system, a mobile device management (MDM) system, a firewall (FW) system, a switch system, an access point system, etc. Network monitor device 102 may be configured to communicate with system 150 to obtain information about devices 120 and 130 and network coupled devices 122*a-b* on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of an entity. The VA system may be able to catalog assets and capabilities or resources of an entity, assign a quantifiable value (or at least rank order) and importance to the resources, and identify the vulnerabilities or potential threats of each resource. The VA system may provide the aforementioned information for use by network monitor device 102.

The advanced threat detection (ATD) or threat detection (TD) system may be configured to examine communications that other security controls have allowed to pass. The ATD system may provide information about an entity including, but not limited to, source reputation, executable analysis, and threat-level protocols analysis. The ATD system may thus report if a suspicious file has been downloaded to a device being monitored by network monitor device 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor device 102.

The firewall (FW) system may be configured to monitor and control incoming and outgoing network traffic (e.g., based on security rules). The FW system may provide information about an entity being monitored including attempts to violate security rules (e.g., unpermitted account access across segments) and network traffic of the entity being monitored.

The switch or access point (AP) system may be any of a variety of network devices (e.g., network device 104 or aggregation device 106) including a network switch or an access point, e.g., a wireless access point, or combination thereof that is configured to provide an entity access to a network. For example, the switch or AP system may provide MAC address information, address resolution protocol (ARP) table information, device naming information, traffic data, etc., to network monitor device 102 which may be used to monitor entities and control network access of one or more entities. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of an entity being monitored in real-time which can then be used to determine a risk level of the entity.

Aggregation device 106 may be configured to communicate with network coupled devices 122a-b and provide network access to network coupled devices 122a-b. Aggregation device 106 may further be configured to provide information (e.g., operating system, entity software information, entity software versions, entity names, application present, running, or both, vulnerabilities, patch level, etc.) to network monitor device 102 about the network coupled devices 122a-b. Aggregation device 106 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122a-b via a wireless connection. Aggregation device 106 may be configured to communicate with network coupled devices 122a-b using a standard protocol with proprietary extensions or modifications.

Aggregation device 106 may further provide log information of activity and properties of network coupled devices 122a-b to network monitor device 102. It is appreciated that log information may be particularly reliable for stable network environments (e.g., where the types of devices on the network do not change often). The log information may include information of updates of software of network coupled devices 122a-b.

Figure 2:
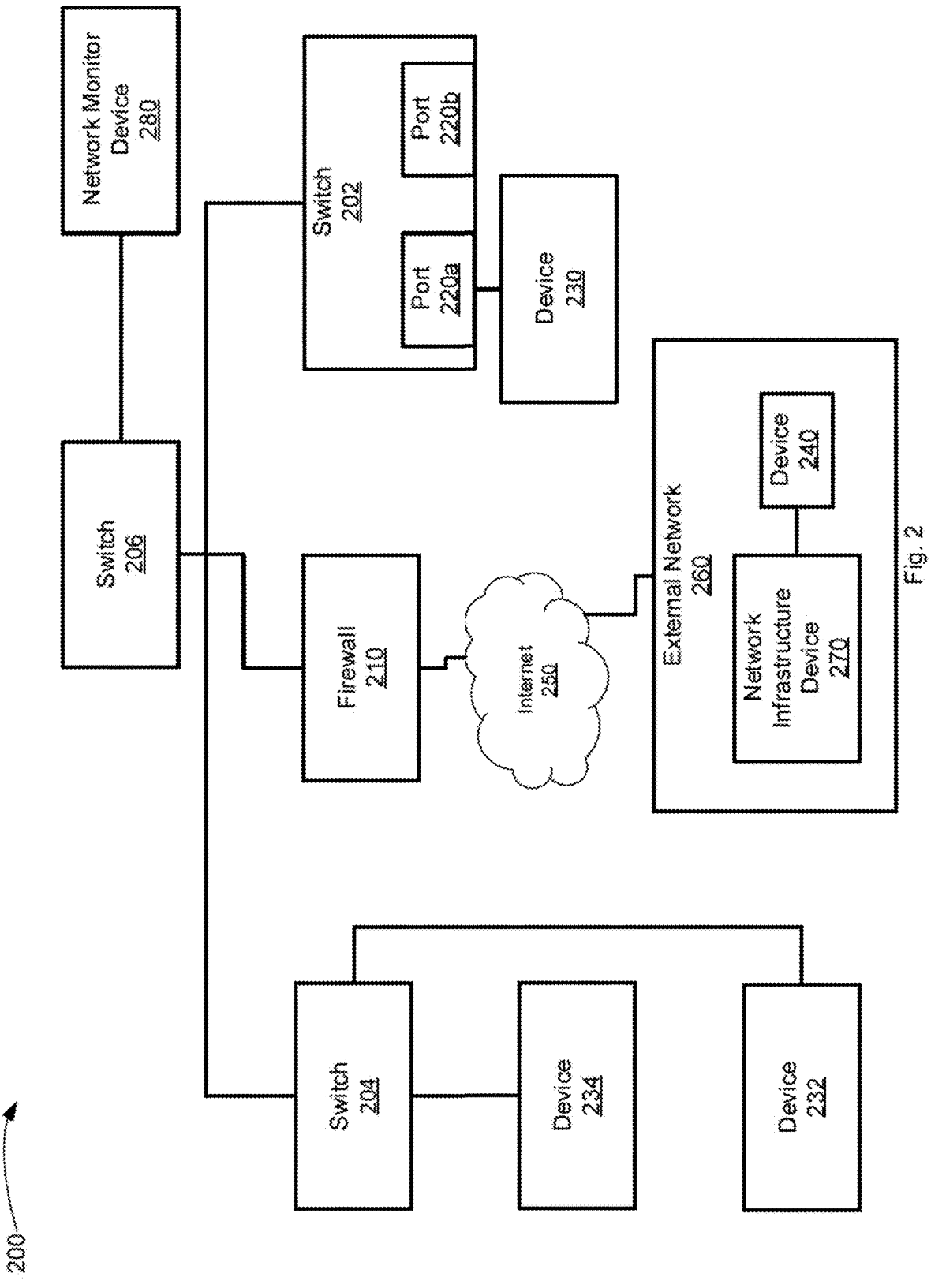
FIG. 2 depicts an illustrative network topology in accordance with one implementation of the present disclosure.

FIG. 2 depicts an illustrative network topology in accordance with one implementation of the present disclosure. FIG. 2 depicts an example network 200 with multiple entry points or network devices (e.g., switches 202-206 and firewall 210), devices 230-234, and a network monitor device 280 (e.g., network monitor device 102) which may monitor network 200 for MAC address spoofing events and perform one or more actions in response to identification of a MAC address spoofing event, as described herein.

Network 200 is further communicatively coupled (e.g., via firewall 210) to one or more external networks including Internet 250 and external network 260. External network 260 may be any of a variety of networks including a data center network, a campus network, an OT network, or a cloud network. External network 260 includes network infrastructure device 270 and device 240.

FIG. 2 shows example devices 230-234 (e.g., devices 106, 122a-b, 120, and 130), example network devices (e.g., network device 104), including switches 202-206, firewall 210, and network infrastructure device 170. It is appreciated that more or fewer network devices or other devices may be used in place of network devices and devices of FIG. 2. For example, switches 202-206 and firewall 210 may be any device (e.g., wireless access point, router, etc.), physical or virtual (e.g., network device 104, cloud infrastructure, etc.) that is operable to control forwarding or passing of traffic, filtering of traffic, dropping packets, or restricting traffic or communication (e.g., via port blocking or restriction, as described herein). Network monitor device 280 (e.g., network monitor device 102) may be any of a variety of network devices, e.g., router, firewall, an access point, network access control (NAC) device, intrusion prevention system (IPS), intrusion detection system (IDS), deception device, cloud-based device, virtual machine based system, etc. Network monitor device 280 may be substantially similar to network monitor device 102. Embodiments support IPv4, IPv6, and other addressing schemes. Embodiments further support a variety of protocols including the 802.1X protocol. In some embodiments, network monitor device 280 may be communicatively coupled with switches 202-206 and firewall 210 through additional individual connections (not shown) (e.g., to receive or monitor network traffic through switches 202-206 and firewall 210, access data stored therein, or a combination thereof, as described herein).

Switches 202-206 communicatively couple the devices (e.g., devices 230-234) of network 200 including firewall 210 and network monitor device 280. Firewall 210 may perform network address translation (NAT) and firewall 210 communicatively couples the devices of the network 200 to the Internet 250 and external network 260. Firewall 210 may restrict or allow access to Internet 250 based on particular rules or ACLs configured on firewall 210. Switches 202-206 may restrict access of a device communicatively coupled thereto, e.g., based on a port blocking or disabling, or VLAN tagging. Switches 202-206 and firewalls 210 are thus enforcement points, as described herein.

Network monitor device 280 is configured to identify or detect MAC address spoofing by one or more devices, invoke or perform an action, or a combination thereof on network 200, as described herein. Network monitor device 280 is configured to monitor the MAC address of each device communicatively coupled to network 200 (e.g., via information on network devices of network 200) and determine if a particular MAC address is being used by more than one device, e.g., a device may be spoofing the MAC address of another device.

For example, an attacker may know that a printer is likely to have a MAC address that is on a MAC address bypass list on an 802.1X network and configure or change the MAC address of a device to match the MAC address of the printer in an attempt to avoid 802.1X authentication on the network. Network monitor device 280 can the monitor the network for use of the MAC address of the printer in two locations on the network, identify the MAC address spoofing event, and take action, as described herein.

Network monitor device 280 is configured to detect MAC address spoofing occurring in different portions of a network. For example, if device 232 has a MAC address of 1:1:1:1:1:1 and device 230 is configured, e.g., by an attacker, to have a MAC address of 1:1:1:1:1:1 and communicatively coupled to switch 202 after device 232 is communicatively coupled to switch 204, network monitor 280 determines that the MAC address of device 232 is being spoofed by device 230. In some embodiments, network monitor device 280 accesses data stores (e.g., caches, tables, etc.) (not shown) of switches 202-204 which each have records or entries associated with devices 232 and 230 and the MAC address 1:1:1:1:1:1:1:1. Each record may include a port and a timestamp associated with the device having the MAC address 1:1:1:1:1:1:1:1 associated with the first time the MAC address was used for communication. Network monitor device 280 may store the timestamp, port and MAC address information for each record having the matching MAC address.

Based on two (or more records) having matching MAC addresses, network monitor 280 may issue a command or request to each of switches 202-204 to clear or delete the records associated with MAC address 1:1:1:1:1:1:1:1. In some embodiments, network monitor device 280 then monitors the data stores of switches 202-204 (and other switches) for new records based on communication of one or more devices with MAC address 1:1:1:1:1:1:1:1. Network monitor device 280 may wait for a period of time (e.g., configurable, for instance, 30 seconds) for creation of records in the data stores on switches 202-204 based on communication from the devices 230-232 using the MAC address of 1:1:1:1:1:1:1:1. In various embodiments, network monitor device 280 may send a request (e.g., ping request) to each of device 230 and device 232 to invoke or cause device 230 and 232 to communicate a response thereby causing the creation of records in data stores of switches 202-204 reflecting whether the MAC address of 1:1:1:1:1:1:1:1 is being used by both devices.

If there are new records on each of the data stores of switches 202-204 (e.g., reflecting that two or more devices are using the same MAC address), network monitor devices 280 may take one or more actions with respect to devices 230-232. Network monitor device 280 may send an alert or notification, as described herein, indicating that a MAC address spoofing event has been detected. The notification may include the ports on the switches where the devices are coupled, identification of the victim device (e.g., device 232) and the attacking device (e.g., device 230) based on the timestamps of when the MAC address was first seen or observed communicating on the network, and possible actions that may be taken (e.g., blocking the ports communicatively coupled to one or both devices). Network monitor device 280 may send one or more commands (e.g., API, CLI, SNMP, etc.) to switch 202 to disable the port (e.g., port 220a) where device 230 is communicatively coupled (e.g., based on device 230 spoofing the MAC address of device 232). In some embodiments, network monitor device 280 may further send one or more commands to switch 204 to disable, block, or restrict the port where device 232 is communicatively coupled (e.g., based on configuration or user input).

In some embodiments, network monitor device 280 may further monitor the MAC addresses of one or more devices that are communicatively coupled to an external network, e.g., network infrastructure device 270. As described above, network monitor device 280 may monitor the data stores or cache of network infrastructure device 270 for a MAC address that matches a MAC address being used (for communications) on network 200.

Extending the example above, if device 240 starts communicating using MAC address 1:1:1:1:1:1:1:1, network monitor device 280 may store the information from the data stores of switches 202-204 and network infrastructure device 270, then send delete commands to switches 202-204 and network infrastructure device 270, and monitor for further communications using the MAC address 1:1:1:1:1: 1:1:1. In some embodiments, network monitor device 280 may send requests (e.g., ping requests) to each of devices 230-232 and device 240 to invoke or cause each of the devices to communicate thereby causing switches 202-204 and network infrastructure device 270 to create new records associated with the MAC address 1:1:1:1:1:1:1:1. Based on the timestamps accessed from the data stores of switches 202-204 and network infrastructure device 270, network monitor device 280 can identify that device 230 and device 240 are spoofing the MAC address of device 234. Network monitor device 280 can take one or more actions, as described herein, including sending commands to network infrastructure device 270 to disable, block, or restrict communication on the port of network infrastructure device 270 where device 240 is communicatively coupled.

Network monitor device 280 is further configured to distinguish between false positive MAC address spoofing events and actual MAC address spoofing events. In some embodiments, network monitor device 280 is configured to delete records associated with a MAC address that are present in two or more data stores on network devices (e.g., switches 202-204), monitor for subsequent communication using the MAC address, and if there is a communication record created for communication only from a single device, network monitor device 280 can determine that the two records associated with a MAC address was a false positive MAC address spoofing event.

For example, this can occur when device 230 was communicatively coupled to port 220a of switch 202, is disconnected from port 220a and connected to port 220b, and the data store of switch 202 reflects communication of device 230 on both ports 220a and 220b. Network monitor device 280 may then cause deletion of the records associated with the MAC address of device 230, as described herein. After a period of time (e.g., configured period of time), network monitor device 280 may determine based on the data store of switch 202 that communication of device 230 is only occurring on port 220b of switch 202, network monitor device 280 may determine that the presence of two records associated with the same MAC address of device 230 on two ports of switch 202 to be a false positive MAC address spoofing event.

In some embodiments, network monitor device 280 may receive a message or indication that two devices with the same MAC address are communicatively coupled with a network device. For example, devices 232 and 234 may be configured with the same MAC address and be communicatively coupled with switch 204. Switch 204 may determine that both devices 232 and 234 are communicating using the same MAC address and then report (e.g., as a trap event) this via a communication to network monitor device 280. Network monitor device 280 may then access a data store of switch 204 to access timestamp and port information associated with devices 232 and 234 and the associated MAC address. Network monitor device 280 may then perform an action, as described herein, including blocking the port where device 232 or 234 is communicatively coupled to switch 204, based on the device that started using the MAC address later in time (e.g., based on the timestamp accessed from the data store of the switch).

In some embodiments, network monitor device 280 may delete or clear records associated with the MAC address being used by device 232 and 234 and monitor for additional communications from devices 232 and 234 using the same MAC address, as described herein. Network monitor device 280 may perform one or more actions, as described herein, after additional communications are sent from device 232 and 234 using the same MAC address. This can avoid false positives identified by switch 204 or if switch 204 is not functioning properly and incorrectly reports that the devices 232 and 234 are using the same MAC address.

Figure 4:
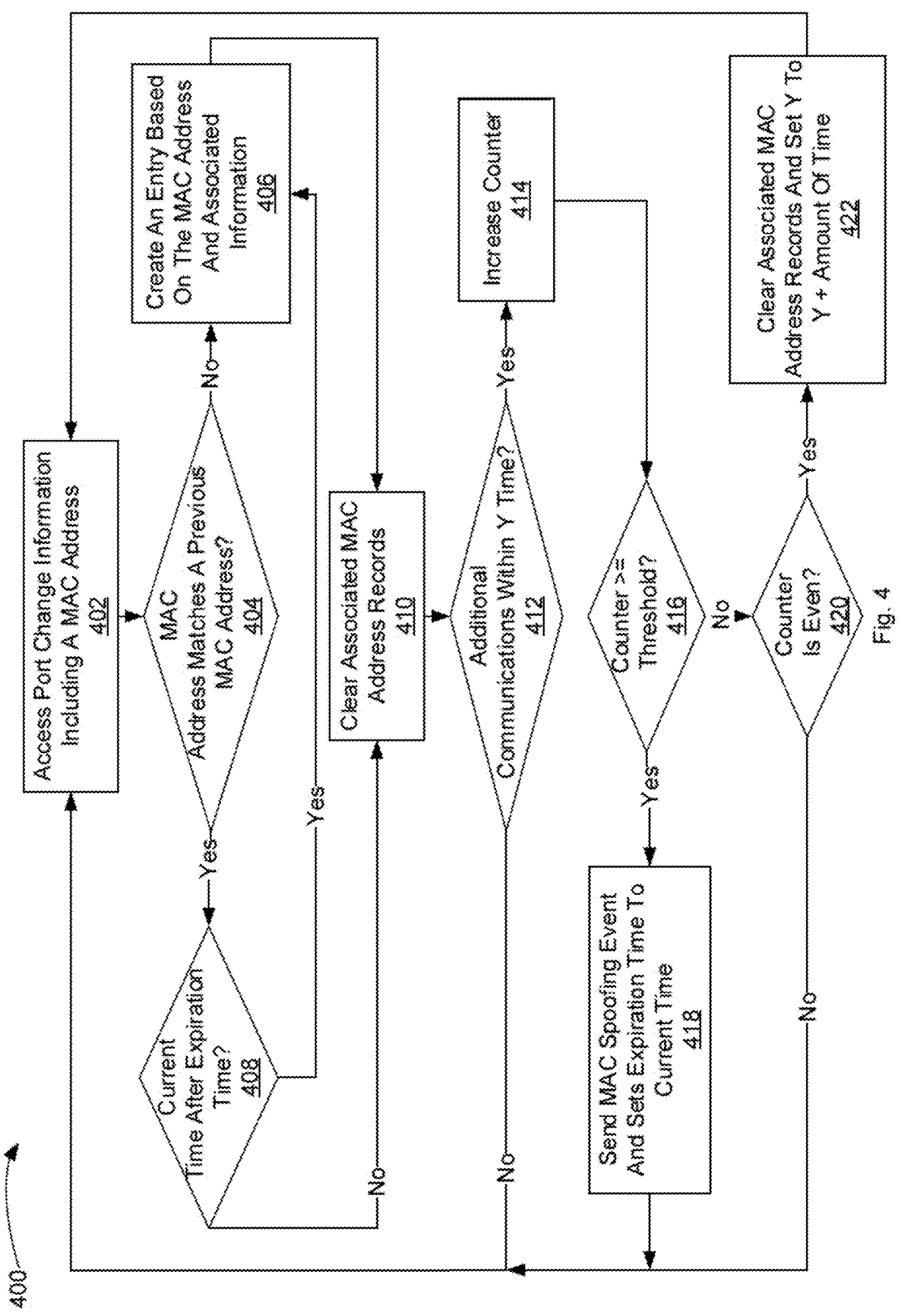
FIG. 4 depicts a flow diagram of aspects of a method for detecting a rogue device within a period of time in accordance with one implementation of the present disclosure.

With reference to FIGS. 3-4, flowcharts 300-400 illustrate example functions used by various embodiments. Although specific function blocks ("blocks") are disclosed in flowcharts 300-400, such blocks are examples. That is, embodiments are well suited to performing various other blocks or variations of the blocks recited in flowcharts 300-400. It is appreciated that the blocks in flowcharts 300-400 may be performed in an order different than presented, and that not all of the blocks in flowcharts 300-400 may be performed.

FIG. 3 depicts a flow diagram of aspects of a method for detecting a rogue device based on MAC address spoofing in accordance with one implementation of the present disclosure. Various portions of flowchart 300 may be performed by different components (e.g., components of system 500) of a network monitoring device (e.g., network monitor device 102 or network monitor device 280). Flowchart 300 depicts a process for detecting MAC address spoofing.

At block 302, a first MAC address associated with a first communication is accessed. MAC addresses may be accessed from a network device (e.g., switch, firewall, router, etc.) via an API, CLI, SNMP interface, or other interface, as described herein. In some embodiments, a network monitor device (e.g., network monitor device 102) may monitor or access data stores of one or more network devices and record or store (e.g., locally) the MAC addresses of devices that are communicating on a network.

At block 304, a second MAC address associated with a second communication is accessed. As described herein, the second MAC address may be accessed from a network device data store. The second MAC address may be a second instance of the first MAC address being used for communication on the network, which embodiments are able to determine whether this is a MAC address spoofing event or other activity (e.g., a device with the first MAC address moving from one port to another on a single network device or to a port on another network device).

In some embodiments, the first MAC address and the second MAC address may be accessed by accessing network traffic, which may be stored by a device (e.g., network monitor 102 or network monitor device 280) based on receiving traffic from one or more network devices (e.g., network device 104, switches 202-206, and firewall 210, etc.).

At block 306, whether the first MAC address and the second MAC address match is determined. The matching of the first MAC address and the second MAC address may be determined by a network monitor device (e.g., network monitor device 102 or network monitor device 280). If the first MAC address and the second MAC address match, block 308 may be performed. If the first MAC address and the second MAC address do not match, block 302 may be performed.

At block 308, a first timestamp associated with the first communication and a second timestamp associated with the second communication is accessed. The first timestamp associated with the first communication in time (and the first MAC address) and the second timestamp associated with the second communication in time (and the second MAC address) may be accessed from a network device (e.g., switch, firewall, router, etc.) via an API, CLI, SNMP interface, or other interface, as described herein. In some embodiments, a network monitor device (e.g., network monitor device 102) may monitor or access data stores of a network device and record or store (e.g., locally) the first timestamp and the second timestamp along with the MAC addresses of devices that are communicating with the network device.

At block 310, a first record associated with the first MAC address and a second record associated with a second MAC address are cleared. The first record associated with the first MAC address and a second record associated with a second MAC address may be cleared from one or more network devices. For example, the first record associated with the first MAC address and a second record associated with a second MAC address may be cleared, removed, or deleted from a data store of a switch where the first MAC address used for communication on a first port and a second MAC address used for communication on a second port. As another example, the first record associated with the first MAC address and a second record associated with a second MAC address may be cleared, removed, or deleted from different network devices where the first MAC address was used for communication on a port of a first switch and a second MAC address was used for communication on a port of a router. The first record and second record may be cleared on different devices that are in different parts of a network or different environments (e.g., one or more devices spread across environments including campus, IoT, datacenter, OT, or cloud). In some embodiments, a first network device and a second network device are configured for authentication using the 802.1X protocol.

In some embodiments, the removing of one or more records associated with one or more MAC addresses may be used to deal with the situation where a network device (e.g., switch) does not remove entries associated with MAC addresses promptly. This may occur where a network device updates its records or data store on a periodic schedule (e.g., every five minutes) or has an aging period. For example, a switch may see a disconnection of a device (e.g., permanently or temporarily) and not remove a record associated with the device (e.g., including the associated with the MAC address, port information, etc.) for five minutes which might otherwise delay detection of a MAC address spoofing event or be a false positive MAC address spoofing event. As another example, if a computer is connected behind a voice over IP (VOIP) telephone, when the VOIP device is disconnected, records, including the associated MAC addresses, in a switch for both the VOIP telephone and computer may remain on the switch of five minutes.

By clearing the records associated with the first MAC address and the second MAC address, embodiments are able to monitor for subsequent communications from the ports where the first MAC address and the second MAC address were observed communicating and thereby determine whether a MAC address spoofing event has occurred (e.g., two devices with the same MAC address are continue to communicate) or other event (e.g., a device has moved from one port to another port, either on the same network device or on different network devices).

In some embodiments, local data store (e.g., of network monitor device 102 or network monitor device 280) records of the matching MAC addresses (e.g., first MAC address and the second MAC address) are cleared and optionally associated information (e.g., including port information) may be also cleared. A query may be sent to the one or more network devices associated with the matching MAC addresses on one or more ports on the network devices to monitor the creation of records associated with the matching MAC addresses (e.g., after communications by the first MAC address and the second MAC address). This query may be part of a period querying of network devices for information about devices communicatively coupled to each network device. This information may also be received from a network device as part of a MAC address notification trap where a network device reports MAC address associated information (e.g., port information) where a device communicatively. The MAC address notification traps may be sent upon or in response to communicative coupling of a network device. The information may then be used as to determine if one or more devices using the same MAC address are continuing to communicate and if a MAC address spoofing event has occurred.

In various embodiments, the local data store records of the matching MAC addresses (e.g., first MAC address and the second MAC address) are cleared in response to block 320 and optionally associated information (e.g., including port information) may be also cleared. Information from a query or a MAC address notification trap may be used as described herein.

At block 312, a first request associated with the first MAC address and a second request associated with the second MAC address are (optionally) sent. In some embodiments, the first request and second request are ping requests, scan requests (e.g., Nmap request or other active probing) or commands or other requests that a device will respond to with a communication thereby creating a record associated with a MAC address of the responding device on a network device. The requests may cause one or more devices to respond to the requests and thereby create records on one or more network devices including MAC addresses of the devices which can then the analyzed by a network monitor device (e.g., network monitor device 102) to determine if a MAC address spoofing event has occurred. In some embodiments, the first and second requests are intended to expedite determination of a MAC address spoofing event.

At block 314, information associated with a third communication associated with the first MAC address is accessed (e.g., from a network device data store). In some embodiments, the information comprises an indication of a device associated with the first MAC address communicating on the network. The information may be accessed from a network device which has recorded or stored details of the third communication by a device using the first MAC address, e.g., including the MAC address, source and destinations ports, device IP address, etc. The network device may have created a new entry or record associated with the first MAC address after an existing record was cleared (e.g., block 310).

At block 316, information associated with a fourth communication associated with the second MAC address is accessed (e.g., from a network device data store). In some embodiments, the information comprises an indication of a device associated with the second MAC address communicating on the network. The information may be accessed from a network device which has recorded or stored details of the fourth communication by a device using the second MAC address, e.g., including the MAC address, source and destinations ports, device IP address, etc. The network device may have created a new entry or record associated with the second MAC address after an existing record was cleared (e.g., block 310).

Based on communications (e.g., the third and fourth communications) from devices associated with the first MAC address and second MAC address matching, embodiments can determine that MAC address spoofing has occurred (e.g., and not a false positive event, as described herein).

At block 318, an action is performed. The action can be performed in response to the identification of a MAC address spoofing event. The action, as described herein, may include reporting a MAC address spoofing event (e.g., a notification to a user, for instance an email, syslog message. HTTP notification message, or notification to another component of a network monitor device, for instance, network monitor device 102), blocking or disabling communication on the port of a network device (e.g., switch, router, firewall, etc.) where the device using the MAC address is communicatively coupled (e.g., second in time using the MAC address), or combination thereof. The action may also or further include sending an alert and or disabling communication of both devices (e.g., the attacking device and the victim device) using the matching MAC addresses or changing the VLAN of the MAC address spoofing device (e.g., to a quarantine VLAN). The action may be performed on the port associated with the device having a second timestamp that is after the first timestamp based on being the device being identified as spoofing the first MAC address. That is, the attacker or attacking device may be identified as using the matching MAC address later in time. The port associated with the device associated with the first timestamp that is prior to the second timestamp can be identified as the victim device.

Embodiments may support performing multiple actions as an attacker or MAC address spoofing device communicatively couples to different ports. The timestamps associated with each communication using the same MAC address may be used for detection of each MAC address spoofing event. For example, a MAC address spoofing device may be communicatively coupled to a first port of a switch which is disabled in response to detection of MAC address spoofing and when the MAC address spoofing device is communicatively coupled to another port, that port may likewise be disabled due to detection of MAC address spoofing. In some embodiments, the ports where a MAC address spoofing device communicatively couples to a network may be monitored and recorded thereby enabling tracking the movement of a rogue device or attacker.

In various embodiments, exclusion of network devices or ports for port blocking/disabling or various other actions based on MAC address spoofing events may be supported via configuration. For example, user configuration may be supported that enables selection of a network switch or various ports thereof for port blocking actions to not be performed. Exclusion of performing port blocking or other actions may also be configured based on a certain number of moves. For example, after a device communicatively couples to five different ports and is blocked based on detected MAC address spoofing, the next time the device communicatively couples, a port blocking action may not be performed based on a configured number of blocked ports. In various embodiments, a maximum number of ports to block may be configured. Types or categories of devices may also be configured to not be blocked. For example, VOIP devices may be selected to not be have associated ports blocked based on detected MAC address spoofing.

In some embodiments, the action performed may be in effect for a period of time, which may be a configurable option (e.g., user configurable). For example, if a network device port is blocked, it may be blocked for one hour or a random amount of time greater than an hour, to allow the port to be available for future use, e.g., after an attacker has moved to another port or disconnected from the network. It is appreciated that leaving the port blocking in effect can prioritize preventing the attacker from accessing the network over the blocking or denial of service on one or more ports. The various configuration settings mentioned herein may be configured via a GUI, API, CLI, SNMP interface, or other interface.

In some embodiments, the action is performed by at least one of a network access control (NAC) device, a switch, a router, a firewall, a hypervisor, software-defined networking (SDN) controller, a virtual firewall, a wireless access point or wireless LAN, or a virtual private network (VPN).

At block 320, a communication from a network device that the first MAC address and second MAC address match is received. A trap or notification may be received from a network device indicating the two devices with matching MAC addresses (or communicating with matching MAC addresses) are communicatively coupled to the network device or are within the same VLAN communicatively coupled to the network device. The network device may indicate that there are collisions occurring because the same MAC address is present at two different locations or ports. The blocks of flowchart 300 may then be performed, as described herein, including using the timestamps associated with MAC address and port information to determine which device is spoofing the MAC address (e.g., the device later in time).

FIG. 4 depicts a flow diagram of aspects of a method for detecting a rogue device within a period of time in accordance with one implementation of the present disclosure. Various portions of flowchart 400 may be performed by different components (e.g., components of system 500) of a network monitoring device (e.g., network monitor device 102 or network monitor device 280). Flowchart 400 depicts a process for detecting a MAC address spoofing within a time period (e.g., a number of location or port changes of a MAC address over a configurable period of time). In some embodiments, the blocks of flowchart 400 implement a monitoring of changes of a MAC address between ports within time based on a criteria that defines a MAC spoofing event. Action can then be taken based on the MAC address spoofing event. In various embodiments, the time period is used to accurately detect MAC address spoofing events while avoiding false positives as devices and users may move around frequently and connect and disconnect for short periods of time.

At block 402, port change information, including a MAC address, is accessed. The port change information be received as an event and be based on a change in the status of a port, e.g., the port was previously down or disconnected or a new device is now communicatively coupled to a port. The port change information may include a MAC address of the device now communicatively coupled to the port, a timestamp of when the device was communicatively coupled to the port or first sent a communication to the port. The port change information may be determined based on monitoring a data store (e.g., cache) of a network device (e.g., switch) for new devices being communicatively coupled thereto.

At block 404, whether the MAC address matches a previous MAC address is determined. The determination of whether the MAC address associated with the port change matches a previous MAC address (e.g., seen on the network currently or before on the network) may be performed based on accessing a local data store of a network monitoring device (e.g. network monitoring device 102 or network monitor device 280) or accessing data stores of network devices (e.g., caches of one or more switches) and comparing the MAC addresses. If the MAC address associated with the port change matches a previous MAC address, block 404 is performed. If the MAC address associated with the port change does not match the previous MAC address, block 406 is performed.

At block 406, an entry based on the MAC address (associated with the port change) and associated information is created. In some embodiments, the entry is a record of the MAC address, the source port and the destination port, the IP address of the device associated with the MAC address, a timestamp, and an expiration time. The source port may be the port on a network device where a device with the MAC address was previously communicatively coupled and the destination port may be a port on the same or another network device where the device with the MAC address is now communicatively coupled. The timestamp is the time the port change occurred. The expiration time can be set to the current time (e.g., timestamp) plus a period of time (e.g., configured) associated with the MAC address spoofing detection, e.g., twenty minutes. The entry for the MAC address may then be used by other blocks of flowchart 400 to count the port changes. A counter variable associated with the particular MAC address is created or initialized to zero and used to track port changes, communications, or a combination thereof associated with the MAC address. The counter variable for the particular MAC address may be used by other blocks of flowchart 400 (e.g., blocks 414, 416, and 420). Embodiments may support a different counter variable for each MAC address that matches a previous MAC address (e.g., as determined in block 404).

In some embodiments, the source port information may be used to identify the port and thereby a device communicatively coupled thereto that is the victim device of a MAC spoofing event. The destination port may similarly be used to determine a device that is the device spoofing the MAC address of the victim device.

At block 408, whether the current time is after an expiration time variable is determined. This determines whether the port change was after the expiration time meaning that the port change was after or outside the time period (e.g., twenty minutes) that is being used to determine MAC address spoofing events. If the current time is after the time value of the expiration time variable, block 406 may be performed. If the current time is not after the time value of the expiration time variable, block 410 may be performed.

At block 410, associated MAC address records are cleared. The records cleared may be one or more records associated with the MAC address associated with the port change (e.g., block 402) on the associated network device and one or more records associated with a previously recorded or observed MAC address that matches the MAC address associated with the port change. For example, records or entries in a cache on a switch associated with the MAC address associated with the port change may be cleared. In some embodiments, the clearing of records may be performed in a substantially similar manner as described with respect to flowchart 300.

At block 412, whether additional communications occur within Y time is determined. The Y time may be a variable with a specified amount of time or configurable amount of time. In some embodiments, Y time may be set to one or more seconds (e.g., five seconds). The additional communications may be communications on a port associated with the MAC address of the port change and the port where the MAC address was previously used for communication (e.g., so communications are monitored for both before and after the port change). The communications may occur because both the device associated with the MAC address change and the device associated with the previous MAC address send communications on the network thereby creating new records (e.g., in a switch cache) associated with the matching MAC address. The determination of additional communications can be done by accessing one or more data stores (e.g., cache) of one or more network devices that have records or entries indicating that one or more devices using the MAC address have communicated with the one or more network devices.

In some embodiments, one or more requests (e.g., ping commands) may be used to invoke or cause the one or more devices using the MAC address associated with the port change to respond or send communications, as described herein. After the request (and responses), records or entries associated with the MAC address may be accessed.

If additional communications occur within Y time, block 414 is performed. If additional communications do not occur within Y time, block 402 is performed. This may occur where only one device associated with the MAC address communicates which would occur when a device has moved and is not a MAC address spoofing event.

At block 414, a counter is increased. The counter is used for tracking the number of times that communications are seen on the network from at least two devices using the same MAC address. In some embodiments, there may be a counter variable used to track each MAC address that is observed being used for communication with at least two devices (e.g., concurrently).

At block 416, whether the counter is less or equal to a threshold is determined. The threshold may be a preconfigured (e.g., with a default value) or configured (e.g., user configurable) number representing the number of times communications seen from at least two devices using the same MAC address that will constitute a MAC address spoofing event. If the counter is less or equal to the threshold, then block 416 is performed. If the counter is not less or equal to the threshold, then block 420 is performed.

At block 418, a MAC address spoofing event is sent and the expiration time variable is set the current time. The MAC address spoofing event may be sent to a module or component that will take an action (e.g., sent an alert, block a port, etc.), as described herein. In some embodiments, the expiration time variable is set to the current time because a MAC address spoofing event has been identified and the time period being monitored is reset so that monitoring for additional MAC address spoofing events can be performed.

At block 420, whether the value of the counter is even is determined. In some embodiment, this value of the counter can be determined to be even based on a modulo two computation (e.g., % operator) of the counter being equal to zero. If the value of the counter is even, block 420 may be performed. If the value of the counter is not even, block 402 may be performed.

At block 422, associated MAC address records are cleared, the Y variable is set to the Y variable value plus an amount of time. The clearing of associated MAC address records may be done as described with respect to block 410. The adjustment of the Y variable can be done to allow time for additional communications to be monitored to assist in the determination of a MAC address spoofing event. In some embodiments, the amount of time added to the Y variable is thirty seconds.

Figure 5:
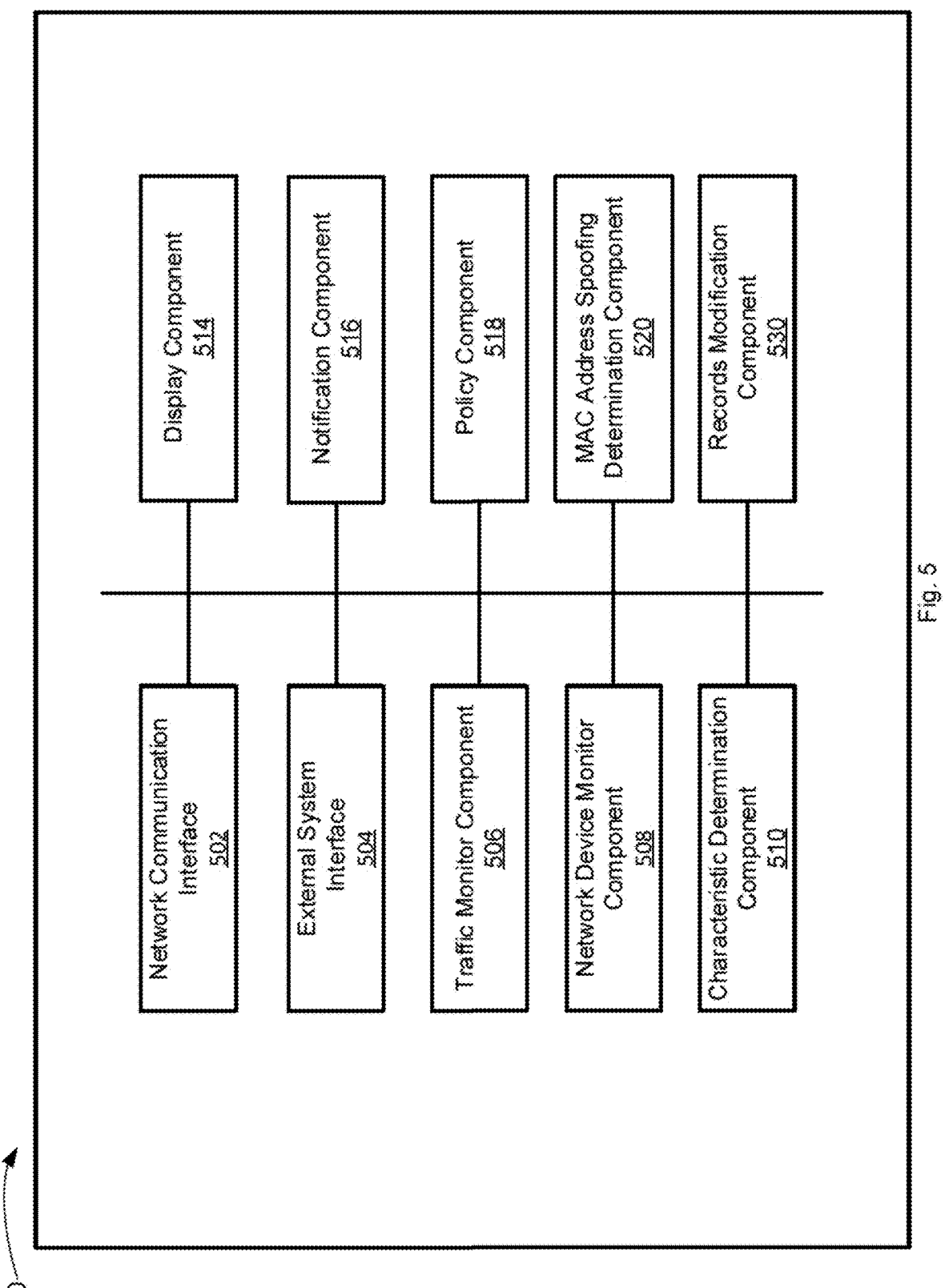
FIG. 5 depicts illustrative components of a system for detecting MAC address spoofing in accordance with one implementation of the present disclosure.

FIG. 5 illustrates example components used by various embodiments. Although specific components are disclosed in system 500, it should be appreciated that such components are examples. That is, embodiments are well suited to having various other components or variations of the components recited in system 500. It is appreciated that the components in system 500 may operate with other components than those presented, and that not all of the components of system 500 may be required to achieve the goals of system 500.

FIG. 5 depicts illustrative components of a system for detecting MAC address spoofing in accordance with one implementation of the present disclosure. Example system 500 includes a network communication interface 502, an external system interface 504, a traffic monitor component 506, a network device monitor component 508, characteristic determination component 510, a display component 514, a notification component 516, a policy component 518, MAC address spoofing determination component 520, and record modification component 522. The components of system 500 may be part of a computing system or other electronic device (e.g., network monitor device 102 or network monitor device 280) or a virtual machine and be operable to monitor and one or more entities communicatively coupled to a network, monitor network devices (e.g., monitor network device data stores), determine whether MAC address spoofing is occurring, and perform one or more actions in response, as described herein. For example, the system 500 may further include a memory and a processing device, operatively coupled to the memory, which may perform the functions of or execute the components of system 500. It is appreciated that the modular nature of system 500 may allow the components to be independent and allow flexibility to enable or disable individual components or to extend/upgrade components without affecting other components thereby providing scalability and extensibility. System 500 may perform one or more blocks of flow diagrams 300 and 400.

Communication interface 502 is operable to communicate with one or more network devices (e.g., network device 104, switches 202-206, firewall 210, etc.) coupled to a network that are communicatively coupled to system 500 and receive or access information about entities (e.g., devices communicatively coupled to a network device, etc.), as described herein. The communication interface 502 may be operable to work with one or more components of system 500 to initiate access to one or more data stores or caches of one or more network devices to enable monitoring for MAC address spoofing, as described herein. Communication interface 502 may be used to send commands to network devices to receive information about devices that are communicating with each network device and modifying the information, as described herein. Communication interface 502 may further be used to send commands (e.g., ping requests) to cause communications after network device data store information has been cleared to determine if a MAC address is being spoofed, as described herein.

External system interface 504 is operable to communicate with one or more third party, remote, or external systems to access information including characteristics about a network device or other device or entity. External system interface 504 may further store the accessed information in a data store. For example, external system interface 504 may access information from a vulnerability assessment (VA) system to enable determination of one or more compliance tags to be associated with an entity or other details that may be reported along with MAC address spoofing. External system interface 504 may be operable to communicate with a vulnerability assessment (VA) system, an advanced threat detection (ATD) system, a mobile device management (MDM) system, a firewall (FW) system, a switch system, an access point (AP) system, etc. External system interface 504 may query a third party system using an API or CLI. For example, external system interface 504 may query a firewall for information (e.g., network session information) about an entity or for a list of entities that are communicatively coupled to the firewall and communications associated therewith. In some embodiments, external system interface 504 may query a firewall or other system for information of communications associated with an entity.

Network device monitor component 506 is operable to monitor information from one or more network devices for possible MAC address spoofing events, as described herein. In some embodiments, network device monitor component 506 is configured to monitor for port changes events determined based on the information from one or more network device data stores, as described herein. Network device monitor component 506 may send information associated with possible MAC address spoofing information to MAC address spoofing determination component 520.

Traffic monitor 508 is configured to perform monitoring and analysis of network traffic (e.g., in real-time, with machine learning, etc.) to monitor MAC addresses being used on a network and determine possible MAC address spoofing events based on a MAC address being used for communication by more than one device in one or more networks (or in remotes part of the network). Traffic monitor 508 may send details of possible MAC address spoofing events to MAC address spoofing determination component 520.

Characteristic determination component 510 is configured to determine one or more characteristics of an entity (e.g., devices and network devices), as described herein. The entity characteristics can then be stored and used by other components for sending commands to a network device to perform an action in response to MAC address spoofing, as described herein. The information about devices (e.g., victim and attacking devices) may be used as part of an alert or notification to provide details about the devices.

Display component 514 is configured to optionally display or render one or more graphical user interfaces or other interfaces (e.g., command line interface) for depicting various information associated with entities, MAC address spoofing events (e.g., both false positive and actual, for instance according to user configuration), and allowing configuration of various settings associated with detection of MAC address spoofing, and configuring actions that should be performed in response to MAC address spoofing, as described herein.

Notification component 516 is operable to initiate one or more notifications based on identification of a rogue device that is spoofing a MAC address and report actions that have been performed in response to the MAC address spoofing, as described herein. The notification may be any of a variety of notifications, e.g., IT ticket, email, SMS, a HTTP notification, etc., as described herein.

Policy component 518 is operable for initiating or triggering one or more remediation actions or security actions according to one or more policies, e.g., in response to a MAC address spoofing event, as described herein. Policy component 518 may further be configured to perform other functions including checking compliance status, finding open ports, etc. Policy component 518 may restrict network access (e.g., by blocking one or more ports), signal a patch system or service, signal an update system or service, etc., as described herein.

The actions may include restricting network access to a particular level (e.g., full, limited, or no network access), blocking communication on a port, remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

MAC address spoofing determination component 520 is configured to analyze data from one or more network devices to determine if a MAC address spoofing event is occurring or has occurred, as described herein. MAC address spoofing determination component 520 may further receive and analyze an indication from a network device that two devices communicatively coupled to the network device are using the same MAC address (e.g., as reported in a switch trap communication), as described herein. MAC address spoofing determination component 520 may coordinate with record modification component 522 to remove records from one or more network devices and then monitor for additional communications by devices using the same MAC address, as described herein. MAC address spoofing determination component 520 may further send requests (e.g., ping requests), as described herein, to invoke or cause devices to communicate and confirm their use of the same MAC address (for communicating) to enable identification of MAC address spoofing.

Record modification component 522 is configured to modify records of a network device to remove records associated with a MAC address that is suspected of being spoofed, as described herein. Record medication component 522 may send commands to one or more network devices to remove, clear, or delete records associated with a particular MAC address, as described herein.

The system 500 may be software stored on a non-transitory computer readable medium having instructions encoded thereon that, when executed by a processing device, cause the processing device to access a first media access control (MAC) address associated with a first communication on a first port of a first network device and access a second media access control (MAC) address associated with a second communication on a second port of a second network device. The instructions may further cause the processing device to determine, using the processing device, a match of the first MAC address and the second MAC address and access information associated with a third communication associated with the first MAC address on the first port of the first network device. The instructions may further cause the processing device to access information associated with a fourth communication associated with the second MAC address on the second port of the second network device and perform an action associated with the second port of the second network device based on the second MAC address matching the first MAC address.

In some embodiments, the instructions may further cause the processing device to clear a first record associated with the first MAC address and a second record associated with the second MAC address after the second communication. In various embodiments, the first record associated with the first MAC address is accessible from the first network device and the second record associated with the second MAC address is accessible from the second network device. In some embodiments, the instructions may further cause the processing device to access a first timestamp associated with the first communication and access a second timestamp associated with the second communication, where the action is performed based on the second timestamp being after the first timestamp.

In various embodiments, the first network device and second network device are configured for authentication using the 802.1X protocol. In some embodiments, the action blocks communication on the second port. In some embodiments, the action is performed by at least one of a network access control (NAC) device, a switch, a router, a firewall, a hypervisor, software-defined networking (SDN) controller, a virtual firewall, a wireless access point or wireless LAN, or a virtual private network (VPN). In various embodiments, the first port of the first network device is communicatively coupled with a first device, the second port of the second network device is communicatively coupled with a second device, and the first MAC address is associated with the first device.

In some embodiments, the instructions may further cause the processing device to send a first request to the first device prior to the third communication and send a second request to the second device prior to the fourth communication. In various embodiments, the action is performed automatically.

In some embodiments, the instructions may further cause the processing device to receive a fifth communication from the first network device, where the fifth communication indicates that the first MAC address and the second MAC address are the same and the first network device and second network device are the same device. The instructions may further cause the processing device to determine a first timestamp associated with the first communication and determine a second timestamp associated with the second communication, where the action is performed based on the second timestamp being after the first timestamp.

Figure 6:
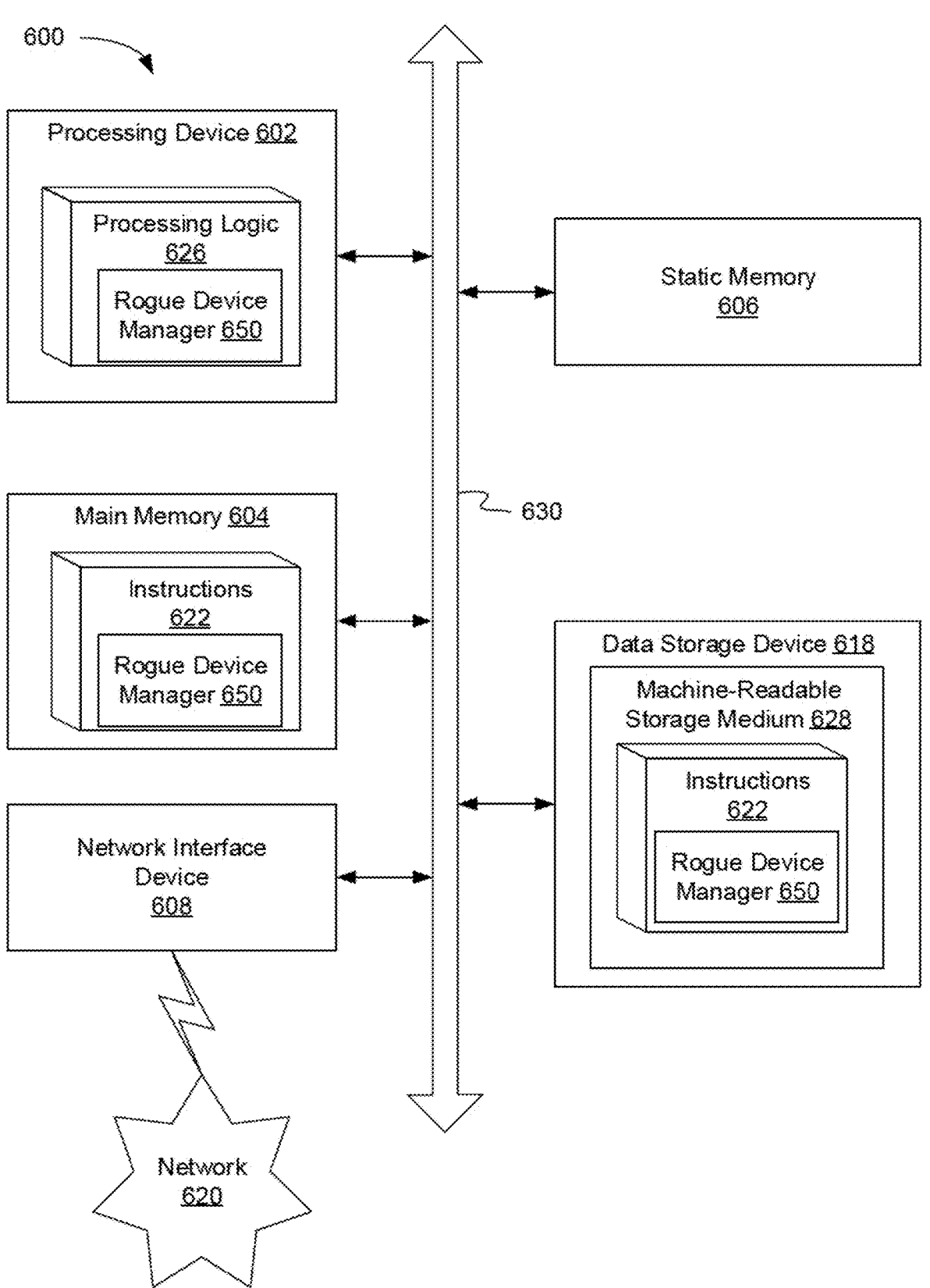
FIG. 6 is a block diagram illustrating an example computer system, in accordance with one implementation of the present disclosure.

FIG. 6 illustrates a diagrammatic representation of a machine in the example form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server, such as network monitor device 102 running rogue device manger 650 to identify and respond to MAC address spoofing, as described herein.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626, which may be one example of rogue device manager 650 shown in FIG. 6, for performing the operations and steps discussed herein.

The data storage device 618 may include a machine-readable storage medium 628, on which is stored one or more set of instructions 622 (e.g., software) embodying any one or more of the methodologies of functions described herein, including instructions to cause the processing device 602 to execute rogue device manager 650. The instructions 622 may also reside, completely or at least partially, within the main memory 604 or within the processing device 602 during execution thereof by the computer system 600; the main memory 604 and the processing device 602 also constituting machine-readable storage media. The instructions 622 may further be transmitted or received over a network 620 via the network interface device 608.

The machine-readable storage medium 628 may also be used to store instructions to perform a method for identifying and responding to MAC address spoofing events, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:

accessing a first media access control (MAC) address associated with a first communication on a first port of a first network device coupled to a network, the first communication being associated with a first timestamp;

accessing a second media access control (MAC) address associated with a second communication on a second port of a second network device coupled to the network, the second communication being associated with a second timestamp;

determining that the second MAC address matches the first MAC address;

identifying a device associated with the first communication or the second communication as being associated with a spoofing event based on the second MAC address matching the first MAC address, based on the second port differing from the first port, and based on the first timestamp and the second timestamp being within a threshold amount of time from one another;

performing an action associated with the first or second port of the second network device responsive to identifying that the device associated with the first communication or the second communication as being associated with a spoofing event;

clearing a first record associated with the first MAC address and a second record associated with the second MAC address;

a configurable period after the clearing, creating at least one of a first new record associated with the first network device or a second new record associated with the second network device.

2. The method of claim 1, wherein the action comprises blocking the device identified as being associated with the spoofing event from the network.

3. The method of claim 1, wherein the first record associated with the first MAC address is accessible from the first network device and the second record associated with the second MAC address is accessible from the second network device.

4. The method of claim 1, further comprising:

accessing information associated with a third communication associated with the first MAC address on the first port of the first network device; and accessing information associated with a fourth communication associated with the second MAC address on the second port of the second network device.

5. The method of claim 1, wherein the action blocks communication on the first port and the second port.

6. The method of claim 1, wherein the action is performed by at least one of a network access control (NAC) device, a switch, a router, a firewall, a hypervisor, software-defined networking (SDN) controller, a virtual firewall, a wireless access point or wireless LAN, or a virtual private network (VPN).

7. The method of claim 1, wherein the first port of the first network device is communicatively coupled with a first device, and wherein the second port of the second network device is communicatively coupled with a second device, and wherein the first MAC address is associated with the first device.

8. The method of claim 4, further comprising:
sending a first request to a first device associated with the first MAC address prior to the third communication; and
sending a second request to a second device associated with the second MAC address prior to the fourth communication.

9. The method of claim 1, wherein the action is performed without user interaction.

10. The method of claim 1 further comprising:
receiving a fifth communication from the first network device, wherein the fifth communication indicates that the first MAC address and the second MAC address are the same, wherein the first network device and second network device are the same device.

11. A system comprising:
a memory; and
a processing device, operatively coupled to the memory, to:
monitor each media access control (MAC) address of a plurality of devices communicatively coupled to a network;
access information comprising a respective timestamp associated with when each device of the plurality of devices was communicatively coupled to the network and each port associated with each device of the plurality of devices, wherein each device of the plurality of devices is communicatively coupled to an associated port;
determine that a first MAC address of a first communication associated with a first port and a first timestamp matches a second MAC address of a second communication associated with a second port and a second timestamp;
identifying a device associated with the first MAC address associated with the first port or the second MAC address associated with the second port as associated with a MAC address spoofing event based on the first MAC address matching the second MAC address, wherein the first port differs from the second port and the first timestamp and the second timestamp are within a threshold amount of time from one another;
perform an action in response to identifying the device associated with the MAC address spoofing event;
clear a first record associated with the first MAC address and a second record associated with the second MAC address;
a configurable period after the clearing, create at least one of a first new record associated with the first network device or a second new record associated with the second network device.

12. The system of claim 11, wherein the action comprises blocking the device identified as being associated with the spoofing event from the network.

13. The system of claim 11, wherein the first record associated with the first MAC address is accessible from a first network device and the second record associated with the second MAC address is accessible from a second network device.

14. The system of claim 11, wherein the first port is communicatively coupled with a first device, and wherein the second port is communicatively coupled with a second device, and wherein the first MAC address is associated with the first device, and wherein the processing device further to:
send a first request to the first device after a clearing of the first record; and
send a second request to the second device after a clearing of the second record.

15. A non-transitory computer readable medium having instructions encoded thereon that, when executed by a processing device, cause the processing device to:
access a first media access control (MAC) address associated with a first communication on a first port of a first network device, the first communication being associated with a first timestamp;
access a second media access control (MAC) address associated with a second communication on a second port of a second network device, the second communication being associated with a second timestamp;
determine that the second MAC address matches the first MAC address;
identify a device associated with the first communication or the second communication as being associated with a spoofing event based on the second MAC address matching the first MAC address, based on the second port differing from the first port, and based on the first timestamp and the second timestamp being within a threshold amount of time from one another;
perform an action associated with the first or second port of the second network device responsive to identifying the device associated with the first communication or the second communication as being associated with a spoofing event;
clear a first record associated with the first MAC address and a second record associated with the second MAC address;
a configurable period after the clearing, create at least one of a first new record associated with the first network device or a second new record associated with the second network device.

16. The non-transitory computer readable medium of claim 15, wherein the action comprises blocking the device identified as being associated with the spoofing event from the network.

17. The non-transitory computer readable medium of claim 15, wherein the first record associated with the first MAC address is accessible from the first network device and the second record associated with the second MAC address is accessible from the second network device.

* * * * *